United States Patent [19]

Jerkins

[11] Patent Number: 4,917,147
[45] Date of Patent: Apr. 17, 1990

[54] BACKWATER ESCAPE VALVE

[76] Inventor: Kenneth R. Jerkins, 1098 Kenwal Rd., Concord, Calif. 94521

[21] Appl. No.: 369,530

[22] Filed: Jun. 21, 1989

[51] Int. Cl.$^4$ ............................................. F16L 55/07
[52] U.S. Cl. .................................. 137/584; 137/527.6; 4/211
[58] Field of Search ..................... 137/584, 527, 527.6, 137/527.8, 356, 358, 360, 236.1; 4/211, 219

[56] References Cited

U.S. PATENT DOCUMENTS

| | | | |
|---|---|---|---|
| 168,517 | 10/1875 | Morrell | 137/527.8 X |
| 480,374 | 8/1892 | Seeback | 251/149.9 |
| 1,553,940 | 9/1925 | Kangieser | 137/527 X |
| 1,763,562 | 6/1930 | Mulder | 137/240 |
| 1,978,507 | 10/1934 | Rand | 4/211 |
| 2,602,168 | 7/1952 | Lally et al. | 137/584 X |
| 2,766,841 | 10/1956 | King | 137/584 X |
| 2,908,286 | 10/1959 | Hallstrom | 137/527.8 X |
| 3,805,826 | 4/1974 | Westerhoff | 137/236.1 X |
| 3,815,629 | 6/1974 | Oberholtzer | 137/527.8 |
| 3,852,836 | 10/1974 | Oberholtzer | 4/211 X |
| 3,941,151 | 3/1976 | Biddle | 137/527.6 |
| 4,039,004 | 8/1977 | Luthy | 137/527 |
| 4,261,386 | 4/1981 | Young | 4/211 X |
| 4,475,571 | 10/1984 | Houston, Jr. et al. | 4/211 X |
| 4,700,732 | 10/1987 | Francisco | 137/360 X |

FOREIGN PATENT DOCUMENTS 426272  11/1947  Italy .

*Primary Examiner*—John Rivell
*Attorney, Agent, or Firm*—Schapp and Hatch

[57] ABSTRACT

A backwater escape valve for plumbing systems comprising a cylindrical body adapted to be coupled to a drainpipe system at the opening normally occupied by a sealing plug, and having a vertically disposed outflow opening covered with a hinged, spring-loaded cover which is adapted to be forced open when the associated sewer becomes blocked and water rises in the associated vertical drainpipe to or near the lowest sink or bathtub coupled thereto.

4 Claims, 2 Drawing Sheets

BACKWATER ESCAPE VALVE

BACKGROUND OF THE INVENTION

1. Field of the Invention.

My invention relates to plumbing systems, and more particularly to backwater escape valves for such systems.

2. Description of the Prior Art.

A basic problem with residential and commercial plumbing systems is the back flow of sewage and drain water into the plumbing fixtures thereof; due, for example, to blockage or obstruction of the associated sewer lines. This problem is exacarbated when the particular residential or commercial plumbing system is that of a multiple-occupancy building, such as an apartment building, an office building, or other multi-unit structure having a large number of drain fixtures therein.

In order to provide access to blockages and obstructions, plumbing codes require commercial and residential plumbing systems to include cleanouts throughout the system.

Typically, a cleanout is comprised of a T-fitting in a drainpipe or sewer line and a threaded plug closing one arm of the T-fitting or closing the outer end of a length of pipe extending from said arm of said T-fitting to a point of relatively easy access, such as a point located outside the outer wall of the building served by the plumbing system and near ground level.

When blockage of a drainpipe or sewer connection occurs and drain water backs up to a sink or the like the threat of overflow can be eliminated by removing the threaded plug from a properly located cleanout which is connected to the drainpipe serving that sink.

U.S. Pat. No. 4,475,571 issued on Oct. 9, 1984, to Houston and Baker, addresses the problem of preventing the backflow of sewage from sewers into drain fixtures by providing a float valve adapted to automatically open the upper end of a vertical pipe extending from a sewer line to a point near the ground surface adjacent the building serviced by the plumbing system.

Such a float valve, however, because of its complexity, is subject to being rendered wholly or partly inoperative by the collection of solids carried by sewer backup.

Further, such float valves are not adapted for use with the now well-known horizontal cleanouts which project from the outer wall of the building serviced by the associated plumbing system at or near ground level.

Yet further, such float valves, because of their multiplicity of parts, etc., are more expensive than is desirable, and thus add to the cost of new plumbing systems.

It is believed that the documents listed immediately below contain information which is or might be considered to be material to the examination hereof.

| U.S. Pat. No. | Inventor |
| --- | --- |
| 168,517 | J. Morrell |
| 480,374 | G. Seeback |
| 1,763,562 | J. Mulder |
| 2,908,286 | O. Hallstrom |
| 4,700,732 | R. Francisco |
| 426,772 (Italy) | B. Belati et al. |

A copy of each of the above-listed documents is enclosed herewith.

The term "prior art" as used herein or in any statement made by or on behalf of applicant means only that any document or thing referred to as prior art bears, directly or inferentially, a date which is earlier than the effective filing date hereof.

No representation or admission is made that any of the above-listed documents is part of the prior art, or that no more pertinent information exists.

SUMMARY OF THE INVENTION

Accordingly, it is an object of my invention to provide a backwater escape valve adapted for use with the well known type of horizontal cleanout, which backwater escape valve is simple in construction, and thus is not subject to blockage or jamming by solids carried in backup water.

A further object of my present invention is to provide backwater escape valves which are economical to manufacture.

A yet further object of my invention is to provide backwater escape valves which are easily connected to conventional horizontal cleanouts.

An additional object of my invention is to provide backwater escape valves which are readily included in new plumbing installations or are easily retrofitted to existing plumbing systems.

Other objects of my invention will in part be obvious and will in part appear hereinafter.

My invention, accordingly, comprises the apparatus embodying features of construction, combinations of elements, and arrangements of parts, all as exemplified in the following disclosure, and the scope of my invention will be indicated in the appended claims.

In accordance with a principal feature of my invention, the body of the backwater escape valve thereof is a hollow member which is provided at one end with external threads which are adapted to sealingly engage the internal threads of a conventional horizontal cleanout which are adapted to receive the sealing plug thereof.

In accordance with another principal feature of my invention the body of the backwater escape valve thereof is provided at its other end with internal threads capable of receiving and sealingly engaging the sealing plug of a conventional horizontal cleanout.

In accordance with yet another principal feature of my invention the external threads and the internal threads of the body of the backwater escape valve of my invention have a common axis.

In accordance with a further principal feature of my invention the body of the backwater escape valve thereof is provided with a branch which is generally symmetrical about an axis perpendicular to said common axis.

In accordance with a yet further principal feature of my invention the branch of the body of the backwater escape valve thereof terminates in an opening the plane of which is parallel to said common axis.

In accordance with an additional principal feature of my invention the backwater escape valve of my invention is provided with a hinged cover adapted to normally cover said opening.

In accordance with another principal feature of my invention the backwater escape valve thereof is provided with resilient biasing means for resiliently biasing said cover into the position in which it covers said opening.

For a fuller understanding of the nature and objects of my invention, reference should be had to the following detailed description, taken in connection with the accompanying drawings.

DESCRIPTION OF THE PREFERRED EMBODIMENT

Figure 1:
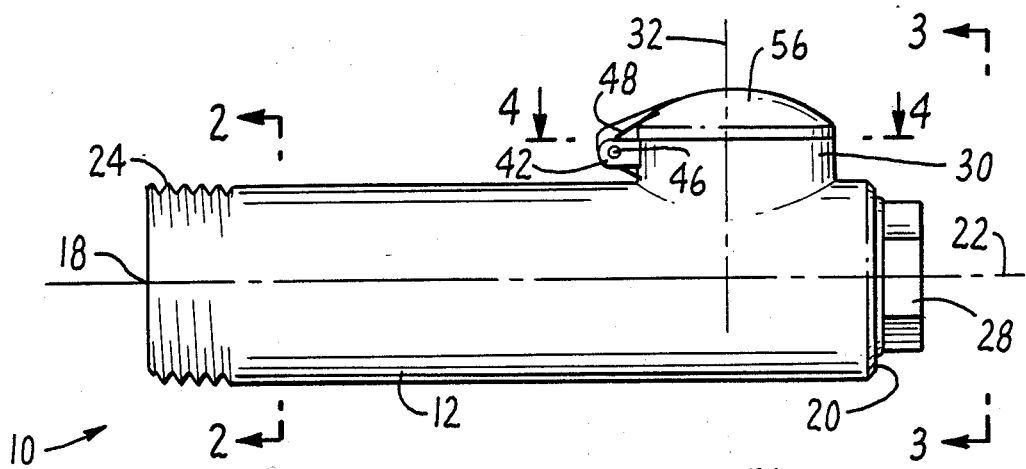
FIG. 1 is an elevational view of the backwater escape valve of the first preferred embodiment of my invention.

Referring now to FIG. 1, there is shown a backwater escape valve 10 constructed in accordance with the first preferred embodiment of my invention.

As seen in FIG. 1, backwater escape valve 10 is comprised of a main body portion 12 which generally resembles a length of drainpipe.

Figure 2:
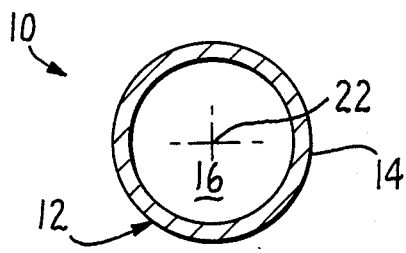
FIG. 2 is a vertical sectional view of the backwater escape valve of the first preferred embodiment of my invention, taken on plane 2—2 of FIG. 1.

Body 12 is comprised of a cylindrical wall 14 (FIG. 2 which defines a passage 16. Passage 16 extends from end to end of body 12. As seen in FIG. 1, passage 16 extends to and through inner end 18 of body 12, and also extends to and through the opposite (outer) end 20 of body 12. Passage 16 is generally cylindrical, and is symmetrical about a principal axis 22 (FIG. 1).

Figure 8:
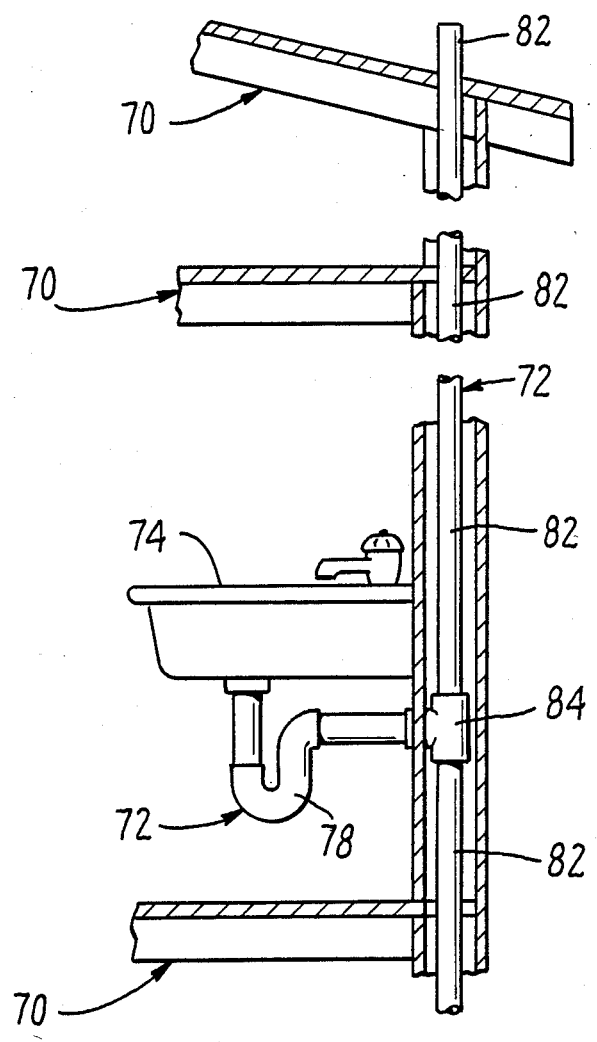
FIG. 8 is an elevational view in partial section of a typical installation of the backwater escape valve of my invention.
Figure 8:
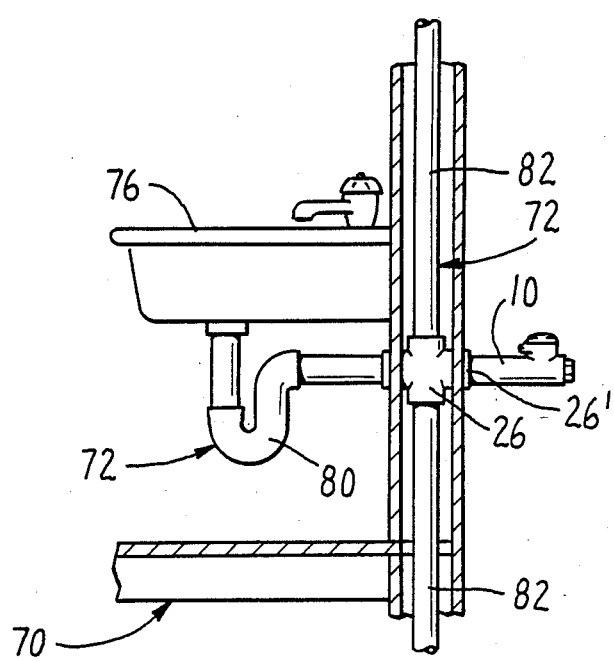

As also seen in FIG. 1, backwater escape valve 10 is provided at inner end 18 with external threads 24 (FIG. 1), whereby by it can be coupled to a conventional drainpipe cleanout fitting 26 (FIG. 8).

At outer end 20 backwater escape valve 10 is provided with internal threads which are adapted to receive the external threads of a standard cleanout sealing plug 28, whereby to close and seal the outer end of backwater escape valve 10.

As further seen in FIG. 1, body 10 is provided with a branch 30 which is circular in cross-section and symmetrical about an axis 32 perpendicular to principal axis 22.

Figure 3:
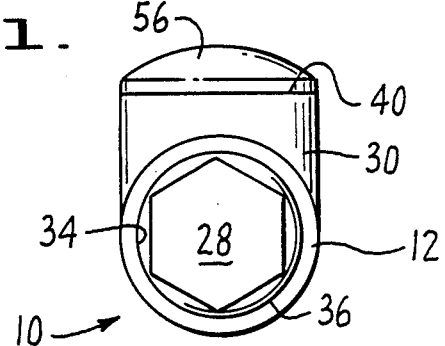
FIG. 3 is an end view of the outer end of the backwater escape valve of the first preferred embodiment of my invention, taken on plane 3—3 of FIG. 1.

As seen in FIG. 3, branch 30 is of substantially the same diameter as that of body 12. The external threads 34 of ceiling plug 28 and the internal threads 36 of body 12 are best seen in FIG. 3.

Figure 4:
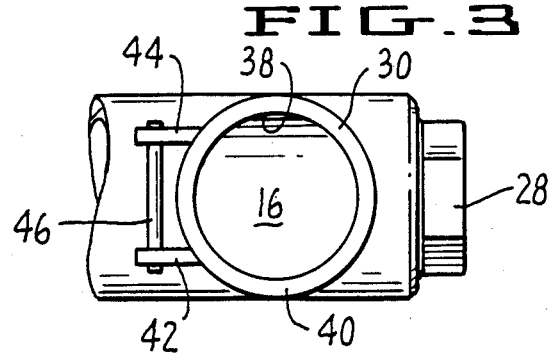
FIG. 4 is a partial plan view of the backwater escape valve of the first preferred embodiment of my invention, taken on plane 4—4 of FIG. 1.

As best seen in FIG. 4, the passage 38 within branch 30 extends completely through branch 30 from passage 16 of body 12 to the open upper end 40 of branch 30.

Comparing FIGS. 3 and 4, it will be seen that the upper end 40 of branch 30 is ring-shaped and planar.

Comparing FIGS. 1 and 4, it will be seen that branch 30 is provided with a pair of ears 42, 44, and that a hinge pin 46 is secured between ears 42, 44 by being passed through and secured in suitable bores in ears 42, 44.

Figure 5:
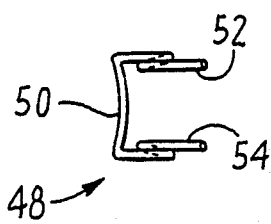
FIG. 5 is a plan view of the cover spring of the backwater escape valve of the first preferred embodiment of my invention.

Referring now to FIG. 5, there is shown a wire spring 48 the purpose of which will be hereinafter described. As seen in FIG. 5, spring 48 is comprised of a yoke member 50 and two arm members 52, 54.

Figure 6:
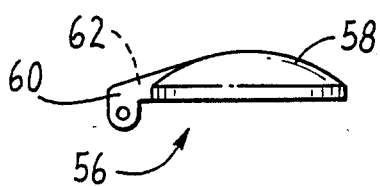
FIG. 6 is a side view of the branch cover of the backwater escape valve of the first preferred embodiment of my invention.

Referring now to FIG. 6, and comparing the same with FIGS. 1 and 3, it will be seen that FIG. 6 shows a branch cover 56 which is comprised of a domed member 58 and two ears 60, 62.

Figure 7:
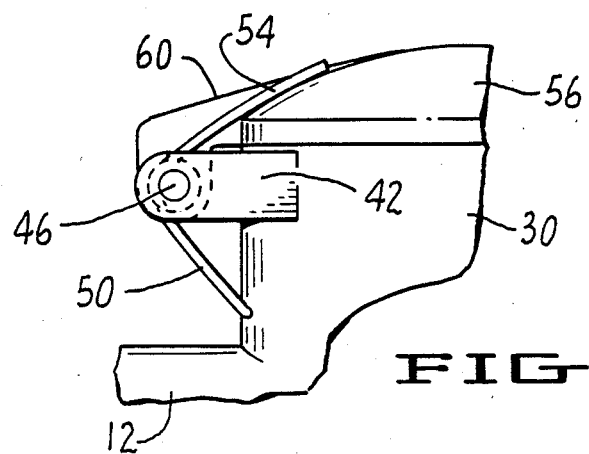
FIG. 7 is a partial elevational view of the backwater escape valve of the first preferred embodiment of my invention, illustrating the cooperation between the branch cover and the branch cover spring.

Referring now to FIG. 7, and comparing the same with FIG. 1, it will be seen that branch cover 56 is hingedly affixed to the upper end of branch 30, so that dome 58 is normally maintained in place on the upper end of branch 30, with the lower face of the outer edge of dome 58 firmly pressed against the upper end 40 of branch 30 by the action of wire spring 48.

As may be seen from FIG. 7, hinge pin 46 passes through the holes in the outer ends of ears 60, 62 as well as the holes in the outer ends of branch ears 42, 44, and thus hingedly mounts branch cover 56 on branch 30.

As also may be seen from FIG. 7, the wire loops lying between the yoke 50 and the ears 52, 54 of wire spring 48 pass around hinge pin 46, and thus arms 50, 52 of wire hinge 48 bear downwardly on the surface of branch cover 56 when yoke 50 bears against branch 30 as shown in FIG. 7.

Thus, it will be seen that in the preferred embodiment wire spring 40 constantly resiliently biases branch cover 56 toward the upper end 40 of branch 30, closing the upper end of branch 30 against the outward flow of fluid from within body 12 except when the pressure of the fluid therein is sufficient to raise branch cover 56 from the upper end 40 of branch 30 against the urging of spring 48.

It is to be understood that in the first preferred embodiment of my invention cover 56 does not latch in its open position, but rather is constantly resiliently biased toward the upper surface 40 of branch 30.

Referring now to FIG. 8, there is shown in partial cross-sectional view a multi-story building 70 which is provided with a plumbing system 72.

Plumbing system 72 includes sinks 74, 76.

In the well known manner, the drain traps 78, 80 of sinks 74, 76, respectively, are coupled to a vertical drainpipe 82 for the purpose of draining sink 74, 76 into an associated sewer (not shown).

Also in the well known manner, drainpipe 82 is fabricated from a plurality of separate pipe lengths, which are joined, for example, by means of a plurality of fittings 26, 84.

As seen in FIG. 8, fitting 84 is a T-fitting of well known type which couples two of the segments of drainpipe 82 with the drainpipe associated with sink 74.

As also seen in FIG. 8 the fitting 26 associated with the drainpipe of sink 76 not only couples two segments of drain pipe 82 and the drainpipe extending from sink 76, but also is provided with an outwardly extending stub 26' which passes through the outer wall of building 70 and is located near the ground level adjacent to building 70. In other installations fitting 26 may be replaced by two T-fittings.

In accordance with conventional practice, stub 26' is provided with a sealing plug substantially identical to sealing plug 28 shown in FIGS. 1, 3 and 4. Thus, in accordance with prior practice, stub 26' is closed by means of a sealing plug like sealing plug 28.

In accordance with my invention, however, the sealing plug normally found in stub 26' is replaced with a backwater escape valve 10 of my invention, as shown in FIG. 8.

As will be evident to those having ordinary skill in the art, informed by the present disclosure, the sealing plug 28 of this backwater escape valve 10 of my invention may be the sealing plug removed from conventional stub 26' when the backwater escape valve 10 of my invention is retrofitted to an existing drainpipe system.

It will thus be seen that the objects set forth above, among those made apparent from the preceding description, are efficiently attained, and since certain changes may be made in the above constructions and the method carried out thereby without departing from the scope of my invention, it is intended that all matters contained in the above description or shown in the accompanying drawing shall be interpreted as illustrative only, and not in a limiting sense.

It is also to be understood that the following claims are intended to cover all of the generic and specific features of my invention herein described, and all statements of the scope of my invention which, as a matter of language, might be said to fall therebetween.

What is claimed is:

1. A backwater escape valve, comprising:

an elongate member having a first internal passage extending from end to end thereof;

external threads at one end of said elongate member which are of the same pitch and diameter as external threads of a cleanout sealing plug;

internal threads at the other end of said elongate member which are of the same pitch and diameter as threads engaged by said cleanout plug;

a branch extending from said elongate member and containing a second internal passage communicating with said first internal passage; and a spring-loaded cover hinged to said branch for closing an end of said second internal passage remote from said first internal passage except when the pressure of water in said passage exceeds a predetermined limit.

2. A backwater escape valve as claimed in claim 1, wherein the external threads of said sealing plug are engaged with said internal threads.

3. A backwater escape valve as claimed in claim 1 in which said cover is urged toward said end of said second internal passage remote from said first internal passage while water is being discharged from said second internal passage.

4. A backwater escape valve as claimed in claim 2 in which said cover is urged toward said end of said second internal passage remote from said first internal passage while water is being discharged from said second internal passage.

* * * * *